(12) United States Patent
Tokunaga

(10) Patent No.: US 7,302,242 B2
(45) Date of Patent: Nov. 27, 2007

(54) PORTABLE PHONE HAVING RECORDING FUNCTION FOR RECORDING CALL-AUDIO WITH USING THE MINIMUM CAPACITY OF MEMORY

(75) Inventor: Koji Tokunaga, Kanagawa (JP)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 09/994,960

(22) Filed: Nov. 27, 2001

(65) Prior Publication Data

US 2002/0080925 A1 Jun. 27, 2002

(30) Foreign Application Priority Data

Nov. 27, 2000 (JP) ............................. 2000-360288

(51) Int. Cl.
*H04B 1/18* (2006.01)
(52) U.S. Cl. ............................... 455/186.1; 455/412.1; 455/414.1
(58) Field of Classification Search .................. 379/83, 379/85, 88.07, 88.22, 88.28; 455/412.1, 455/413, 550.1, 416
See application file for complete search history.

(56) References Cited

U.S. PATENT DOCUMENTS

| | | | | |
|---|---|---|---|---|
| 5,550,754 A * | 8/1996 | McNelley et al. | ....... | 348/14.01 |
| 5,699,410 A * | 12/1997 | Imamura et al. | ......... | 379/88.16 |
| 5,732,349 A * | 3/1998 | Sanpei et al. | ............ | 455/435.1 |
| 5,790,957 A * | 8/1998 | Heidari | .................... | 455/553.1 |
| 5,815,426 A * | 9/1998 | Jigour et al. | .................. | 365/51 |
| 6,021,325 A | 2/2000 | Hall | | |
| 6,029,063 A * | 2/2000 | Parvulescu et al. | ....... | 455/412.1 |
| 6,222,909 B1 * | 4/2001 | Qua et al. | ................ | 379/88.22 |
| 6,658,496 B1 * | 12/2003 | Minakata et al. | .............. | 710/5 |
| 6,859,609 B1 * | 2/2005 | Watkins | ....................... | 386/46 |
| 2001/0041559 A1 * | 11/2001 | Salabaschew | .............. | 455/412 |

FOREIGN PATENT DOCUMENTS

| | | | |
|---|---|---|---|
| CN | 1131857 A | | 9/1996 |
| EP | 920171 A2 | * | 6/1999 |
| EP | 1104146 A1 | * | 5/2001 |
| EP | 1113652 A2 | * | 7/2001 |
| FR | 2722633 A3 | * | 1/1996 |
| GB | 2295522 A | * | 5/1996 |
| JP | 63048039 A | * | 2/1988 |
| JP | 63-1133361 | * | 7/1988 |
| JP | 2-168764 | | 6/1990 |
| JP | 5-54289 | * | 8/1993 |
| JP | 6-152800 | | 5/1994 |
| JP | 8-9017 | | 1/1996 |
| JP | 10-13243 | * | 1/1998 |

\* cited by examiner

*Primary Examiner*—Duc M. Nguyen
*Assistant Examiner*—Dai Phuong
(74) *Attorney, Agent, or Firm*—Scully, Scott, Murphy & Presser P.C.

(57) ABSTRACT

A portable phone having a recording function to which this invention is applicable comprises a plurality of memories, a switching unit, and a reproducing unit. Each of the memories is used for endless-recording, as a conversation content audio data during the telephone conversation. The switching unit can switch the memories from a first memory of the memories to a second memory of the memories so that the second memory endless-records the audio data instead of the first memory which endless-records, as the conversation content, the audio data until then. The reproducing unit is used for reproducing the conversation content that the first memory endless-records before being switched by the switching unit.

3 Claims, 4 Drawing Sheets

PORTABLE PHONE HAVING RECORDING FUNCTION FOR RECORDING CALL-AUDIO WITH USING THE MINIMUM CAPACITY OF MEMORY

BACKGROUND OF THE INVENTION

This invention relates to a portable phone such as a portable digital portable phone or a PHS (Personal Handy phone System) phone and, particularly, to a portable phone having a recording function such that call-audio is converted into digital data and recorded as the digital data.

In case where a user of the portable phone makes or receives a call when he is on the move, it is frequently difficult to take notes of the contents of a call. To get rid of such inconveniences, the portable phone generally has a recording or a memorizing function to make a record of the contents of the call (call-audio). Such a portable phone having a recording function is disclosed in for example, Japanese Unexamined Patent Publications (JP-A) No. 13243/1998.

A portable phone of the type described in the publication has a codec-(coder-decordr), a microphone, a receiver (speaker), a DSP (Digital Signal Processor), a radio unit, a key, a display, and a central processing unit. An antenna is connected to the radio unit. A memory is connected to the central processing unit.

During the call, the central processing unit controls the recording and reproduction of audio data in accordance with the operation inputted by the key. Specifically, when the command for recording the audio is given by the operation of the key, the central processing unit stores the audio data which was encoded by the codec and compressed by the DSP and/or stores compressed audio data which was received by the radio unit and demodulated by the DSP in the memory. When the command for reproducing the audio is given by the operation of the key, under the control of the central processing unit, the audio data which was taken out from the memory is expanded by the DSP and changed into an analogue audio by the codec and then reproduced by the receiver.

By the use of the portable phone as described, the user can record, whenever there is a need, the content of the call by a simple operation of the keys and thereafter reproduce and check the recorded contents. However, the portable phone can make a record of the call only when the user gives a recording command so that the recording starts after the key operation by the user. In order to make a record of a call before the recording operation has started, the user, either a receiver or a caller, should repeat the conversation such that the extra time is required for a wasteful communication.

For example, Japanese Unexamined Utility Model Publication (A) No. 113361/1988 and Japanese Unexamined Patent Publication (A) No. 298123/1990 disclose methods to overcome the above-mentioned drawback.

The utility model publication describes a "telephone having a recording function" having a cassette tape recorder which accommodates an endless tape therein. When a receiver is picked up, the telephone set automatically starts recording a call. The user of the telephone set can reproduce the endless tape and repeat the conversation to check the contents of the call.

The patent publication describes a "radio set" which changes every received audio signal into digital signal and which successively records the digital signal into a memory and, upon the request by the user, reads out the contents of the memory and reproduces the contents as speech signal. The recording of audio signal automatically restarts as the reproduction of the contents in the memory is completed.

However, the above-mentioned publications have the following problems. Because the telephone having the record function is provided with the cassette tape recorder, the telephone is large and therefore unsuitable. In the radio set, in case where the recording time exceeds the total recording capacity of the memory, the contents which have been recorded earlier are deleted in order of recordation. In this event, it may be impossible to listen and check the earlier recorded contents. Although this drawback will be overcome if a memory having a huge recording capacity as the endless memory is provided, such an apparatus is increased in cost and may require long time to access to the desired contents.

Furthermore, in the method of reproducing the contents as speech signal, it is not possible to record nor hear the newly given information during the recorded contents are reproduced.

SUMMARY OF THE INVENTION

According to this invention, a portable phone having a recording function is provided by which conversation contents can be recorded, even during telephone conversation, by the use of a minimum recording capacity of a memory without repeating the conversation by the calling mate and lacking a part of the conversation contents.

This invention is, for example, directed to a portable phone having a recording function for recording audio data during a telephone conversation. The portable phone comprises a plurality of memories, a switching unit, and a reproducing unit. Each of the memories is used for endless-recording, as a conversation content, the audio data during the telephone conversation. The recording is endlessly carried out by any one of the memories. The switching unit switches a first memory to a second memory so that the second memory endless-records the audio data instead of the first memory which has been carrying out endless-recording until then. The reproducing unit is used for reproducing the conversation content which the first memory endless-records before being switched by the switching unit.

The other features and advantages of this invention will become clear as the description proceeds.

DESCRIPTION OF THE PREFERRED EMBODIMENTS

In order to facilitate an understanding of this invention, description will at first be made with reference to the drawings as regards an existing portable phone having a recording function described in the background of this specification.

Figure 1:
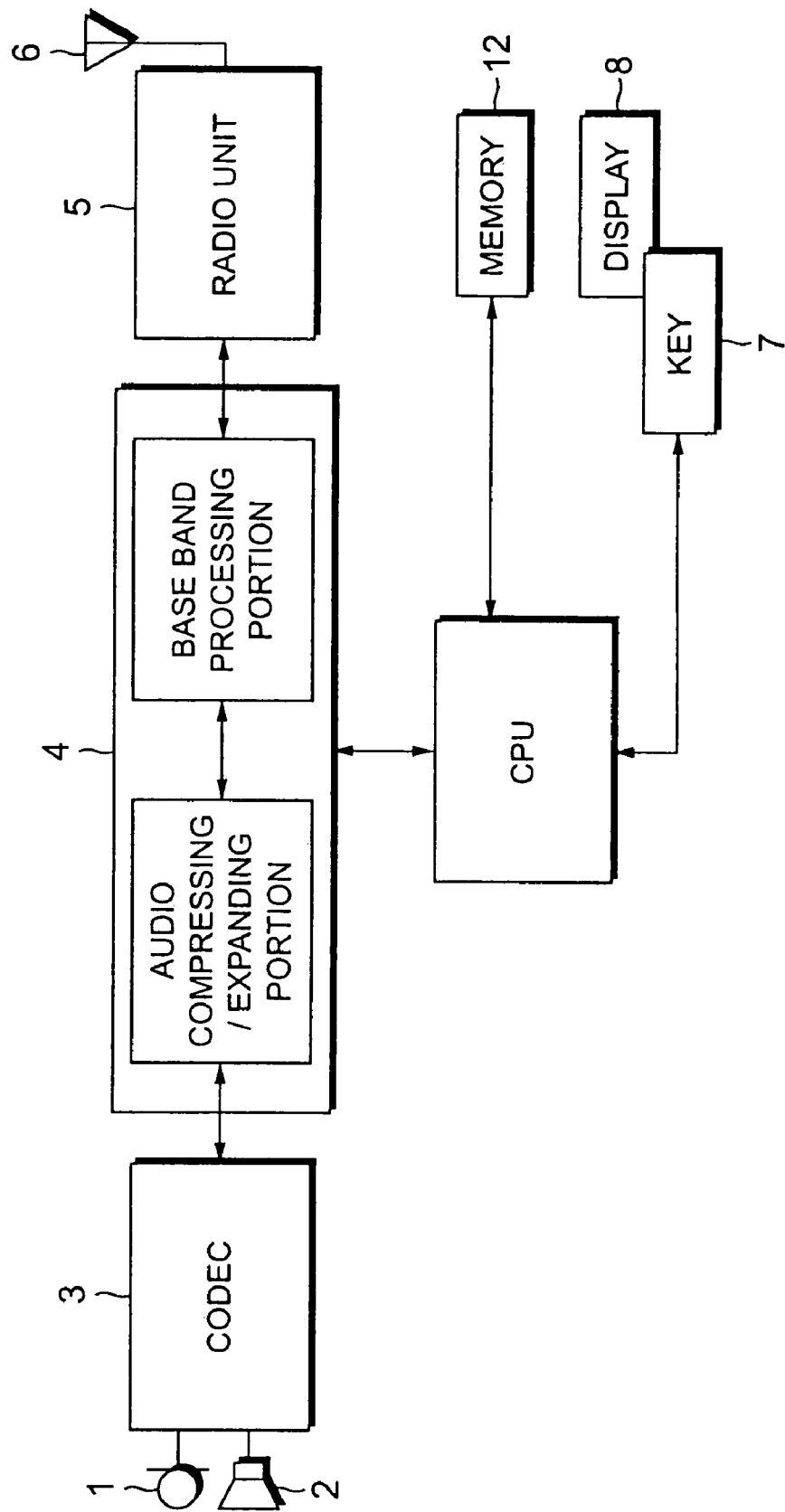
FIG. 1 is a block diagram showing an existing digital portable phone having a recording function.

FIG. 1 is a block diagram showing a portable phone similar to the portable phone mentioned in the publication. Referring to FIG. 1, the portable phone has a codec (coder-decordr) 3 for encoding audio from a microphone, decoding digital signal, and outputting decoded digital data to a receiver (speaker) 2, a DSP (Digital Signal Processor) 4 compressing/expanding the digital data (by an audio compressing/expanding portion) and processing such as filtering by a base band (by a base band processing portion), a radio unit 5 modulating/demodulating radio frequency by the digital signal, a key 7 and a display 8 as a user interface, and a central processing unit 9 controlling the functions of units of the portable phone. An antenna 6 is connected to the radio unit 5. A memory 12 is connected to the central processing unit 9.

The central processing unit 9 controls the recording and reproduction of audio data in accordance with the operation inputted by the key 7.

Specifically, when the command for recording the audio is given by the operation of the key 7, the central processing unit 9 stores the audio data which was encoded by the codec 3 and compressed by the DSP 4 and/or stores compressed audio data which was received by the radio unit and demodulated by the DSP in the memory 12. When the command for reproducing the audio is given by the operation of the key, under the control of the central processing unit 9, the audio data which was taken out from the memory 12 is expanded by the DSP 4 and changed into an analogue audio by the codec 3 and then reproduced by the receiver 2.

By the use of the portable phone as described, the user can record, whenever there is a need, the content of the call by a simple operation of the keys 7 and thereafter reproduce and check the recorded contents. However, the portable phone can make a record of the call only when the user gives a recording command so that the recording starts after the key operation by the user. In order to make a record of a call before the recording operation has started, the user, either a receiver or a caller, should repeat the conversation such that the extra time is required for a wasteful communication.

Now, a preferred embodiment of this invention will be described with reference to drawings.

Figure 2:
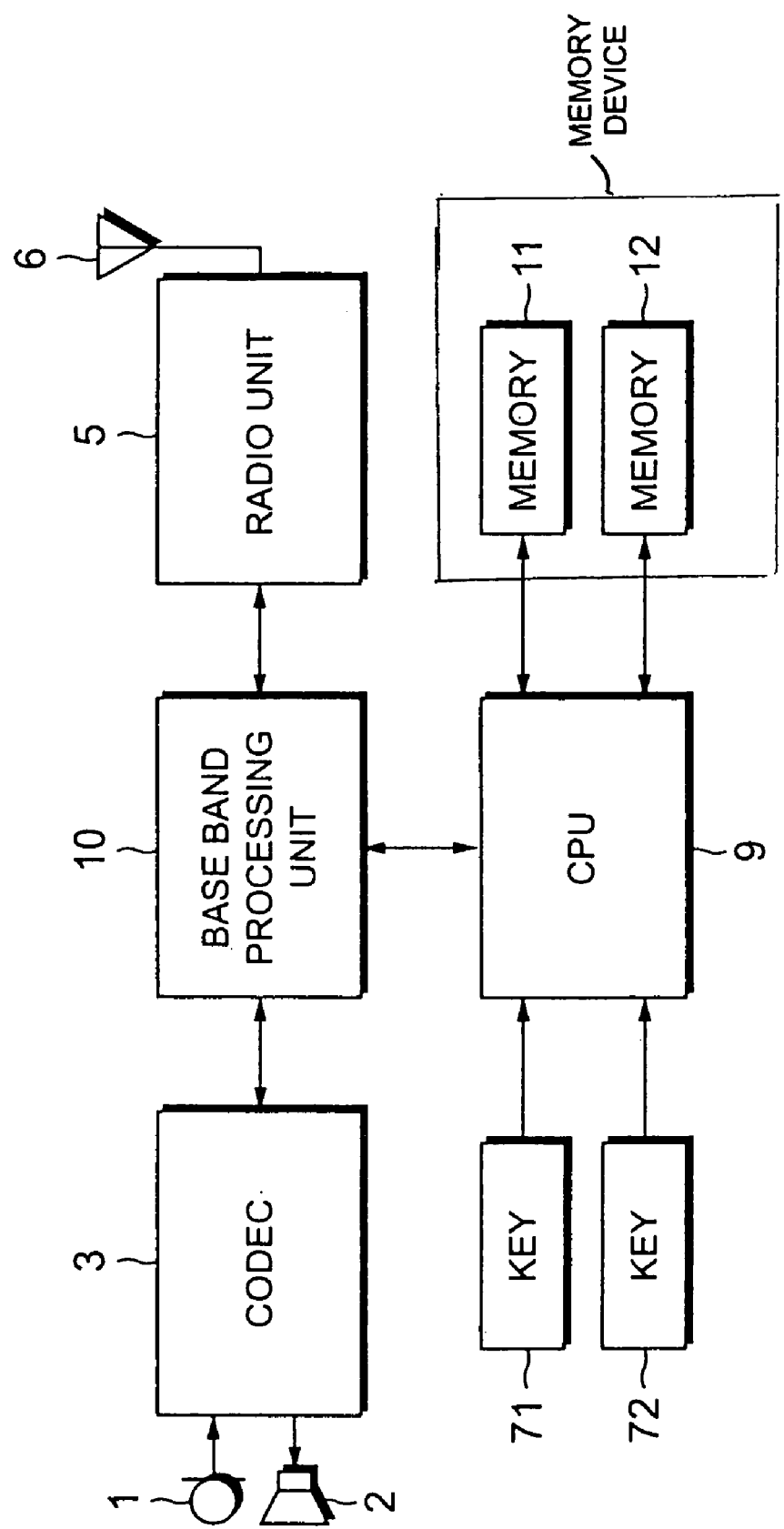
FIG. 2 is a block diagram showing a digital portable phone having a recording function according to an embodiment of this invention.

FIG. 2 is a block diagram showing a portable phone according to an embodiment of this invention. Referring to FIG. 2, the portable phone has a codec (coder-decordr) 3 for encoding audio from a microphone, decoding digital signal, and outputting decoded digital data to a receiver (speaker) 2, a base band processing unit 10 processing the digital data by the use of a base band, a radio unit 5 modulating/demodulating radio frequency by the digital signal, keys 71 and 72 as a user interface, and a central processing unit 9 controlling the each functions of units of the portable phone. An antenna 6 is connected to the radio unit 5. Memories 11 and 12 are connected to the central processing unit 9. Instead of the base band processing unit 10, the DSP 4 as shown in FIG. 1 may be used.

Recording and reproduction of audio according to conversation contents during telephone conversation are carried out as follows.

During the telephone conversation, the audio (analogue audio signal) from the microphone 1 is provided to the codec 3. The codec 3 changes the analogue audio signal into a digital data. The base band processing unit 10 processes the digital data by the base band. The radio unit 5 transmits the processed digital data processed through the antenna 6. The digital data processed are also endless-recorded in the memory 11 one by one by controlling by the CPU 9.

When the key 71 is operated during the recording of the digital data in the memory 11 as mentioned above, the endless-record of the digital data in the memory 11 is stopped and alternately an endless-record of the digital data in the memory 12 is started. The digital data which have been recorded in the memory 11 are kept therein. By the control of the CPU 9 in accordance with the operation inputted from the key 72, the digital data kept in the memory 11 is sent to the base band processing unit 10 and is converted in the codec 3 to be reproduced from the receiver 2.

Figure 3:
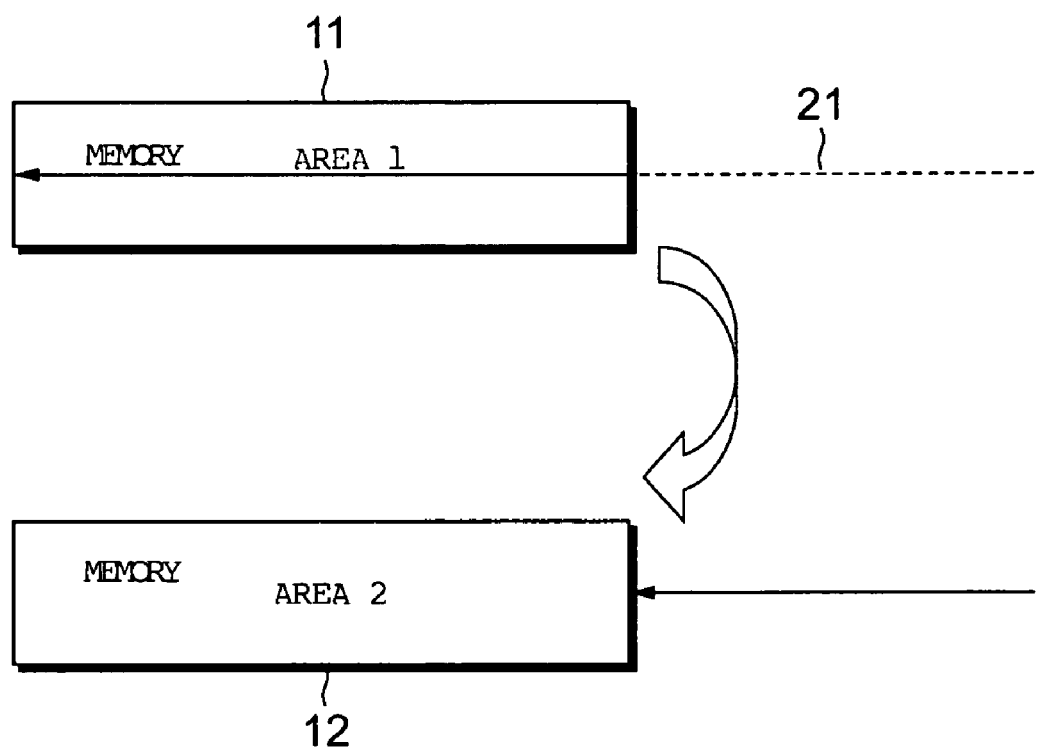
FIG. 3 is a concept diagram showing memory areas for illustrating a recording process by the digital portable phone shown in FIG. 2 in which data are recorded in a memory used in the digital portable phone.

FIG. 3 conceptually shows memory areas for illustrating the recording process by the digital portable phone. Referring to FIGS. 2 and 3, the digital data during the telephone conversation are continually endless-recorded in the memory (memory area) 11 so that previous data are updated by new data. Namely, the latest digital data continually recorded in the memory 11 for a predetermined period of time. In response to the operation inputted from the key 71 during the above-mentioned state (at a moment 21), the digital data which have been recorded in the memory 11 are not updated and kept intactly. After the moment, the digital data are recorded in the memory (memory area) 12.

The memories 11 and 12 may be constituted by a memory device (memory chip). In other words, the memory device is divided into plural memory areas. Each of the memory areas can individually endless-record the data.

Because the recent conversation is endless-recorded, the user of the portable phone may operate the key 71 whenever he wants to keep the contents of the conversation as the digital data. In this manner, the portable phone can record, with using the minimum recording capacity of the memory, the conversation contents requested to be recorded during the telephone conversation without the trouble of repeating the conversation. In addition, the user can replay the recorded conversation contents at all times.

Figure 4:
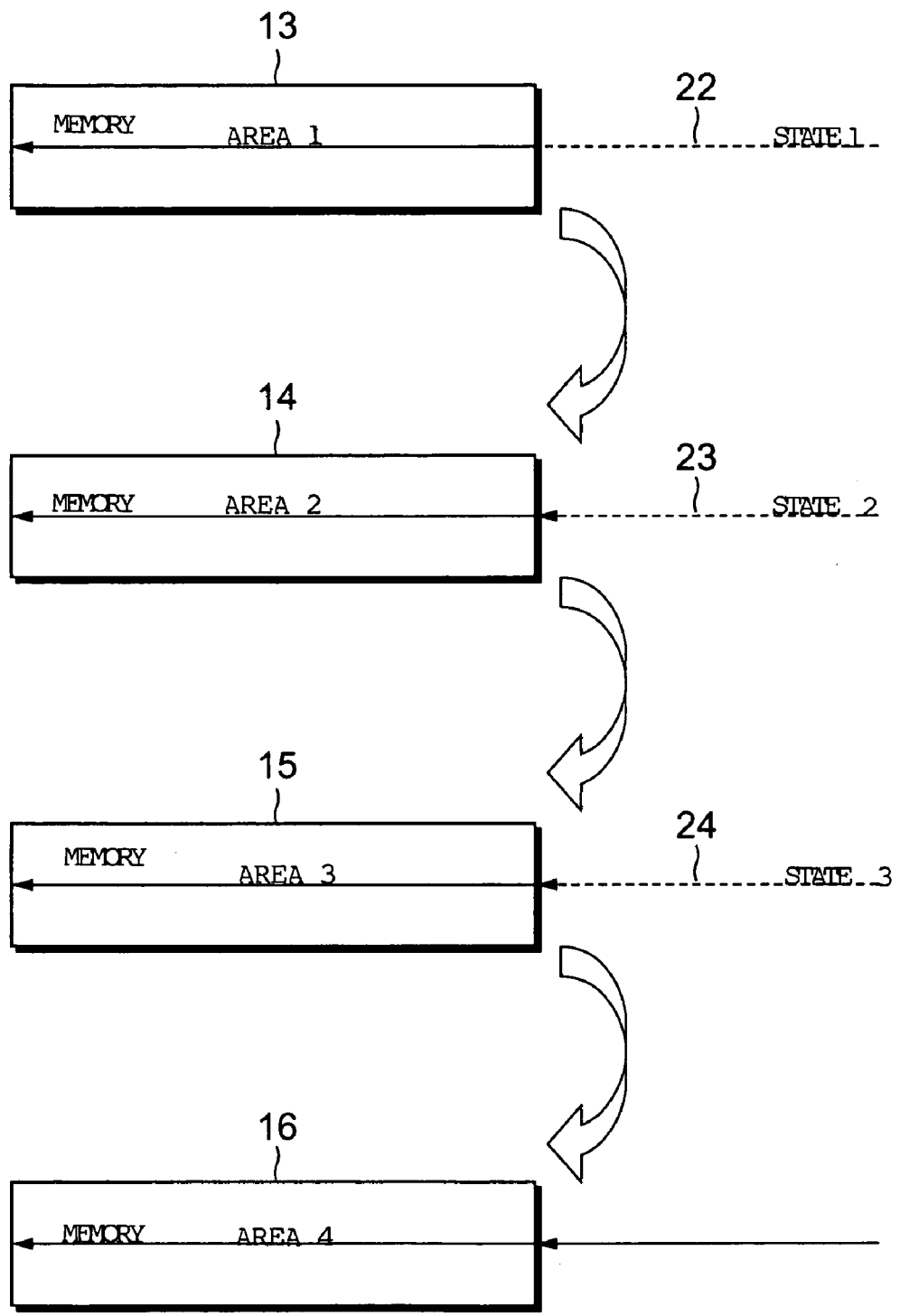
FIG. 4 is a concept diagram showing memory areas for illustrating a recording process by a digital portable phone having a recording function according to another embodiment of this invention in which data are recorded in a memory used in the digital portable phone.

FIG. 4 conceptually shows memory areas for illustrating the recording process by a digital portable phone having a recording function according to the second embodiment of this invention. The portable phone has the structures basically similar to the portable phone shown in FIG. 2. Therefore, the description and the illustration of the structures similar to the previous description are omitted. According to the second embodiment, four memory areas are provided.

Referring to FIG. 4, the digital data during the telephone conversation are continually endless-recorded in the memory (memory area) 13 so that previous data are updated by new data. At a moment 22 when a switching operation is made, recording into the memory 13 is stopped and alternately the digital data are endless-recorded in the memory (memory area) 14. At a moment 23 when a switching operation is made, recording to the memory 14 is stopped and alternately the digital data are endless-recorded in the memory (memory area) 15. Further, at a moment 24 when a switching operation is made, recording to the memory 15 is stopped and alternately the digital data are endless-recorded in the memory (memory area) 16. Thus, the contents of the conversation are recorded in four areas.

The conversation contents recorded in each memory area can be reproduced as follows with reference to FIG. 1. When the key 72 is operated once, the conversation contents recorded in all of the memory areas are continually reproduced from the receiver 2 in order of the recording, the earlier recording being reproduced first and the latest recording at last. It is also possible to reproduce the conversation contents recorded in each of the memory areas by operating the key 72 once for every recorded contents. In this event the conversation contents are reproduced from the receiver 2 in the order of the recording, the earlier recording being reproduced first and the latest recording at last.

While this invention has thus far been described in conjunction with embodiments thereof it will readily be possible for those skilled in the art to put this invention into practice in various other manners. For example, the number of the memories or the memory areas is not limited to two or four.

What is claimed is:

1. A portable phone having a recording function for recording audio data during a telephone conversation, said portable phone comprising:

a plurality of memories, each of which is for endless-recording, as a conversation content, the audio data during the telephone conversation;

a switching unit configured to switch said memories from a first memory of said memories to a second memory of said memories so that said second memory endless-records the audio data of a current conversation instead of said first memory which endless-records, as the conversation content, the audio data, until said switching unit switches said memories from said first memory to said second memory; and a reproducing unit for reproducing the conversation content which said first memory endless-recorded before being switched by said switching unit, while the second memory endless-records the audio data of the current conversation simultaneously with the reproducing of the conversation content from said first memory, wherein when one of the plurality of memories becomes full during the telephone conversation, the audio data in the full memory is overwritten and endless-recording the audio data continues.

2. A portable phone as claimed in claim 1, wherein said memories are constituted by a plurality of memory areas of a single memory device, said memory areas configured to individually endless-record the audio data.

3. A portable phone as claimed in claim 1, further comprising a key for operating said reproducing unit to reproduce the audio data;

said reproducing unit successively reproducing the conversation contents in the order of recording in which said memories record the conversation contents.

* * * * *